United States Patent
Koishi

(10) Patent No.: US 6,728,070 B2
(45) Date of Patent: Apr. 27, 2004

(54) FLYING HEAD SLIDER CAPABLE OF AVOIDING COLLISION WHEN LOADED

(75) Inventor: Ryosuke Koishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/739,944

(22) Filed: Dec. 18, 2000

(65) Prior Publication Data

US 2001/0053046 A1 Dec. 20, 2001

(30) Foreign Application Priority Data

Jun. 1, 2000 (JP) ........................................ 2000-164409

(51) Int. Cl.⁷ ............................. G11B 21/21; G11B 5/60
(52) U.S. Cl. ................. 360/236; 360/236.2; 360/236.3; 360/235.6
(58) Field of Search ........................... 360/235.4, 235.5, 360/235.6, 236, 236.2, 236.3, 235.8

(56) References Cited

U.S. PATENT DOCUMENTS

| 5,128,822 A | * | 7/1992 | Chapin et al. | 360/236.3 |
| 5,309,303 A | * | 5/1994 | Hsia et al. | 360/236.1 |
| 5,777,825 A | * | 7/1998 | Dorius | 360/235.6 |
| 5,822,153 A | * | 10/1998 | Lairson et al. | 360/234.7 |
| 5,917,679 A | * | 6/1999 | Park et al. | 360/235.6 |
| 5,926,343 A | * | 7/1999 | Dorius et al. | 360/235.6 |
| 5,940,249 A | * | 8/1999 | Hendriks | 360/235.6 |
| 5,949,614 A | * | 9/1999 | Chhabra | 360/235.6 |
| 6,021,020 A | * | 2/2000 | Itoh et al. | 360/235.5 |
| 6,034,842 A | * | 3/2000 | Cha | 360/235.6 |
| 6,069,769 A | * | 5/2000 | Dorius et al. | 360/235.6 |
| 6,072,662 A | * | 6/2000 | Utsunomiya | 360/236.1 |
| 6,134,083 A | * | 10/2000 | Warmka | 360/235.6 |
| 6,178,064 B1 | * | 1/2001 | Chang et al. | 360/235.6 |
| 6,317,294 B1 | * | 11/2001 | Wada et al. | 360/235.6 |
| 6,424,494 B1 | * | 7/2002 | Koishi | 360/235.6 |
| 6,462,909 B1 | * | 10/2002 | Boutaghou et al. | 360/235.8 |

FOREIGN PATENT DOCUMENTS

| JP | 60109073 A | 6/1985 |
| JP | 63064684 A | 3/1988 |

* cited by examiner

Primary Examiner—Brian E. Miller
(74) Attorney, Agent, or Firm—Greer, Burns & Crain, Ltd.

(57) ABSTRACT

A flying head slider includes a slider body. The upstream or leading end of a bottom surface on the slider body is defined along a first datum line extending in the lateral direction of the slider body. The first datum line may be set perpendicular to the longitudinal centerline of the slider body. The upstream or leading end of the front air bearing surface is defined along a second datum line intersecting the first datum line at a predetermined inclined angle. As the incidence angle of an airflow colliding against a step defined at the leading end of the front air bearing surface gets decreased, the pitch angle of the slider body also gets decreased in the flying head slider during flight.

10 Claims, 18 Drawing Sheets

FLYING HEAD SLIDER CAPABLE OF AVOIDING COLLISION WHEN LOADED

BACKGROUND OF THE INVENTION

1. Field of the Invention

The present invention relates to a head slider accommodated in a recording medium drive such as a hard disk drive (HDD), in particular, to a flying head slider comprising a slider body, a generally flat bottom surface defined on the slider body, a front rail standing on the bottom surface at an upstream or windward position, and an air bearing surface defined on the front rail.

2. Description of the Prior Art

A load/unload mechanism employing a ramp is well known in the technical field of a magnetic disk drive such as a hard disk drive (HDD). The ramp is designed to support an elastic head suspension, carrying a head slider at the tip end, when a magnetic recording disk stands still. For example, the ramp serves to cause bending of the head suspension, in response to an outward movement of the head slider in the radial direction of the magnetic recording disk, so as to keep the head slider distanced from the surface of the magnetic recording disk. Without the support of the ramp, the head slider cannot keep distanced from the surface of the magnetic recording disk when the magnetic recording disk stands still.

When the head suspension is released from the support of the ramp in response to an inward movement of the head slider, the head slider is forced to contact the surface of the magnetic recording disk. In this case, the head slider cannot keep distanced from the surface of the magnetic recording disk without a lift resulting from an airflow generated along the surface of the rotating magnetic recording disk. If the head slider takes an inclined attitude different from a predetermined normal or horizontal attitude, the head slider cannot receive a lift enough to fly above the surface of the magnetic recording disk. The elasticity of the head suspension causes the head slider to collide against the surface of the magnetic recording disk. In particular, the head slider including a front rail extending in the lateral direction of a slider body is designed to allow generation of a larger negative pressure behind the front rail, so that the head slider tends to suffer from the collision with the assistance of the negative pressure in the aforementioned situation.

The head slider can be formed to receive a relatively larger lift even when the head slider takes the inclined attitude. This enables a reliable prevention of the collision of the head slider against the magnetic recording disk when the head suspension is released from the support of the ramp. However, in this case, the behavior of the head slider becomes sensitive to variation in the flow rate of the airflow. For example, the stability is lost in the attitude of the head slider. Specifically, the pitch angle of the head slider tends to remarkably increase as it gets closer to the rotational axis of the magnetic recording disk, since the airflow of a smaller flow rate is generated along the surface of the magnetic recoding disk at an inward position closer to the rotational axis as compared with that at an outward position closer to the outer periphery. The upstream or leading end of the head slider is more distanced apart from the magnetic recording disk at the outward position. In particular, the head slider including the front rail extending in the lateral direction tends to suffer from decrease in the negative pressure as it gets closer to the rotational axis. This involuntarily induces variation in the flying height of the head slider.

SUMMARY OF THE INVENTION

It is accordingly an object of the present invention to provide a flying head slider capable of avoiding any collision upon dropping off a ramp without losing the stability of the attitude during flight.

According to a first aspect of the present invention, there is provided a flying head slider comprising: a slider body; a generally flat bottom surface defined on the slider body; a front rail standing on the bottom surface at an upstream position; a front air bearing surface defined on the front rail; a rear rail standing on the bottom surface at a downstream position; and a rear air bearing surface defined on the rear rail. The upstream end of the bottom surface is defined along a first datum line extending in the lateral direction of the slider body, while the upstream end of the front air bearing surface is defined along a second datum line intersecting the first datum line at a predetermined inclined angle.

The flying head slider is designed to receive an airflow at the front and rear air bearing surfaces so as to fly. If the lift generated on the front air bearing surface gets increased in response to an increase in the flow rate of the airflow, the attitude of the slider body varies during flight of the flying head slider, for example. However, a decreased incidence angle of the airflow in response to the increase in the flow rate of the airflow enables a stable attitude of the slider body during flight of the flying head slider. The inclined angle defined between the first and second datum lines serves to intentionally induce the decrease in the incidence angle of the airflow in the flying head slider of the first aspect.

In particular, it is preferable that the front rail is designed to define a front surface standing on the bottom surface at a position distanced downstream from the upstream end of the bottom surface. The front surface of this type allows generation of a relatively larger lift on the flying head slider at the moment when the flying head slider falls and starts receiving the airflow. Consequently, the amount of falling of the flying head slider can be minimized. Moreover, even when the slider body takes an inclined attitude keeping the upstream or leading end lower during the falling of the flying head slider, the front surface also serves to straighten the inclined attitude of the slider body. The slider body is forced to take the normal attitude in which the slider body receives an enough lift resulting from the airflow. When the flying head slider of this type is employed in a recording disk drive, the flying head slider is reliably prevented from colliding against a recording medium or disk at the moment when the flying head slider is loaded.

According to a second aspect of the present invention, there is provided a flying head slider comprising: a slider body; a generally flat bottom surface defined on the slider body; a front rail standing on the bottom surface at an upstream position so as to extend in a lateral direction of the slider body; a front air bearing surface defined on a top surface of the front rail; a rear rail standing on the bottom surface at a downstream position; a rear air bearing surface defined on the rear rail; a front surface defined on the front rail so as to stand on the bottom surface at a position distanced downstream from an upstream end of the bottom surface; a step connected to an upstream end of the front air bearing surface on the front rail; a first columnar piece standing on the bottom surface along the front surface; and a second columnar piece standing on the bottom surface along the front surface so as to define an air clogging dished space adjacent the front surface in cooperation with the first columnar piece.

The front surface allows generation of a relatively larger lift on the flying head slider at the moment when the flying head slider falls and starts receiving the airflow in the aforementioned manner. Consequently, the amount of falling of the flying head slider can be minimized. Moreover, the air clogging dished space enables a stable attitude of the slider body during flight of the flying head slider irrespective of any increase in the flow rate of the airflow.

BRIEF DESCRIPTION OF THE DRAWINGS

The above and other objects, features and advantages of the present invention will become apparent from the following description of the preferred embodiments in conjunction with the accompanying drawings, wherein.

DESCRIPTION OF THE PREFERRED EMBODIMENTS

Figure 1:
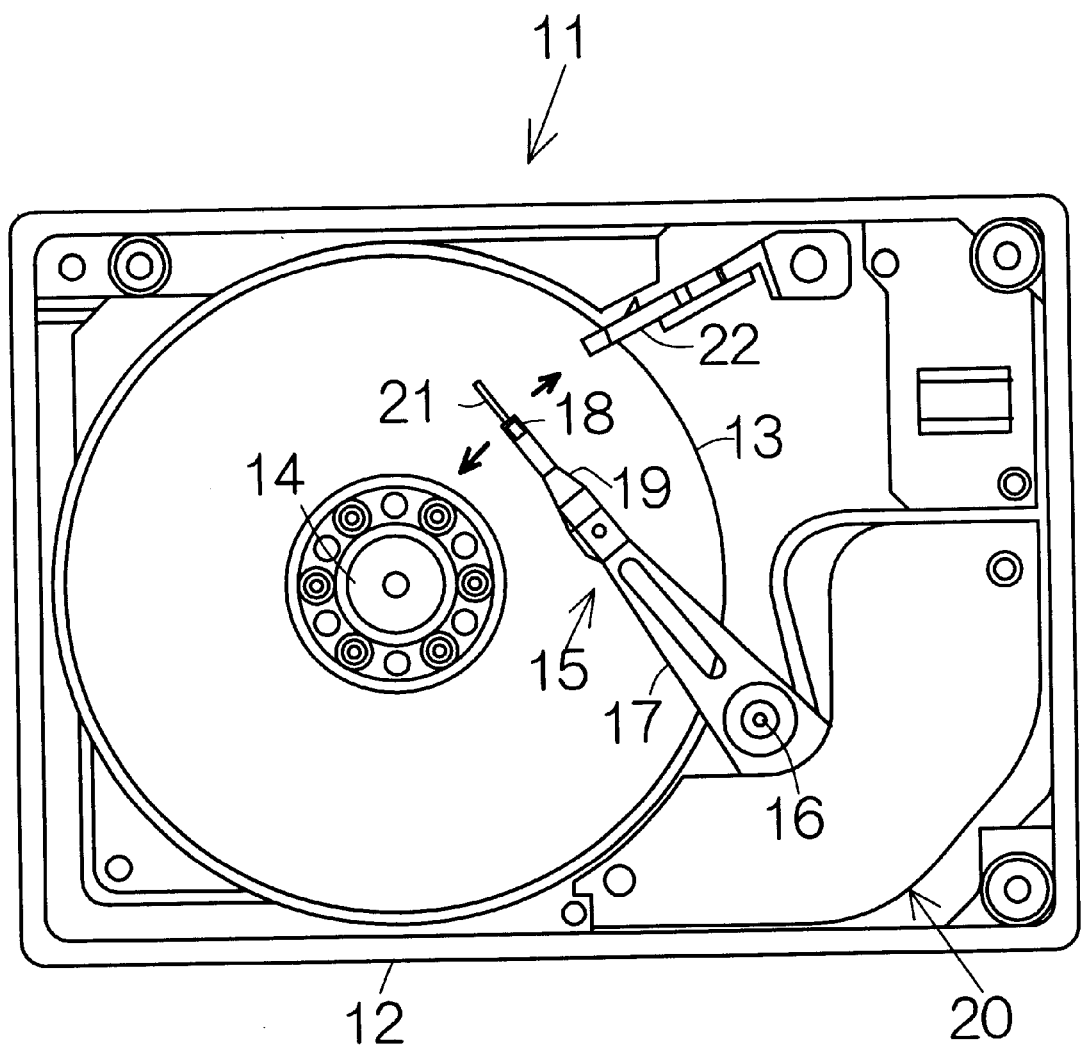
FIG. 1 is a plan view schematically illustrating a hard disk drive (HDD) as an example of a recording disk drive.

FIG. 1 schematically illustrates the inner structure of a hard disk drive (HDD) as an example of a recording medium drive. The HDD 11 includes a box-shaped primary enclosure 12 defining an inner space of a parallelepiped, for example. At least one magnetic recording disk 13 is accommodated in the inner space of the primary enclosure 12. The magnetic recording disk 13 is mounted on a driving shaft of a spindle motor 14. The spindle motor 14 is designed to drive the magnetic recording disk 13 for rotation at a higher rate such as 7,200 rpm or 10,000 rpm, for example. A cover, not shown, is coupled to the primary enclosure 12 so as to seamlessly close the inner space of the primary enclosure 12.

A carriage 15 is also accommodated in the inner space of the primary enclosure 12. The carriage 15 is designed to oppose its tip end to the surface of the magnetic recording disk 13. The carriage 15 includes a swinging arm 17 designed to swing around a support shaft 16, and a head suspension 19 fixed to the tip end of the swinging arm 17. The head suspension 19 is designed to carry a flying head slider 18 at the tip end. An electromagnetic actuator 20 such as a voice coil motor (VCM) serves to realize the swinging movement of the swinging arm 17, for example. The swinging movement of the swinging arm 17 allows the flying head slider 18 to move across the surface of the magnetic recording disk 13 in the radial direction thereof. This radial movement serves to position the flying head slider 18 right above a target recording track defined on the surface of the magnetic recording disk 13. As conventionally known, when two or more magnetic recording disks 13 are accommodated in the primary enclosure 12, a pair of the flying head sliders 18, namely, the head suspensions 19 are mounted on a single common swinging arm 17 between the adjacent magnetic recording disks 13.

A load bar 21 is attached at the tip end of the carriage 15, namely, the individual head suspension 19. The load bar 21 extends forward from the tip end of the head suspension 19. The load bar 21 is allowed to move in the radial direction of the magnetic recording disk 13 along with the flying head slider 18 in response to the swinging movement of the swinging arm 17.

Figure 2:
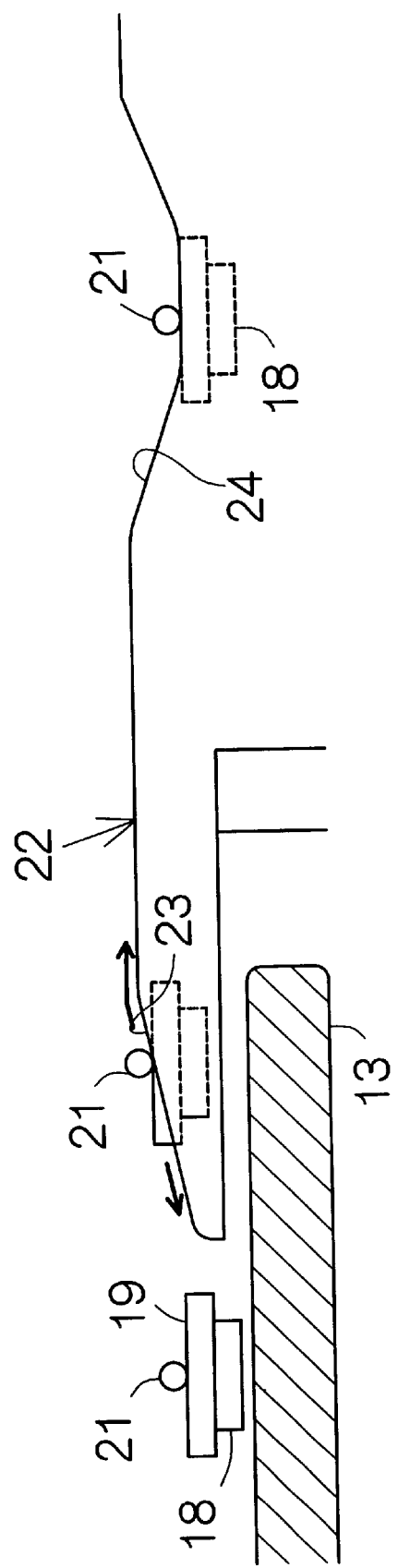
FIG. 2 is a schematic view illustrating the structure of a load/unload mechanism.

A ramp member 22 is disposed on a path of movement of the load bar 21 at a position outside the outer periphery of the magnetic recording disk 13. As shown in FIG. 2, the load bar 21 is allowed to climb up a slant 23 defined on the ramp member 22 as the flying head slider 18 moves in the outward direction along the radial direction of the magnetic recording disk 13. The flying head slider 18 is thus distanced apart from the surface of the magnetic recording disk 13 as the load bar 21 moves upward along the slant 23. When the load bar 21 has completely climbed up the slant 23 so as to enter a depression 24 on the ramp member 22, the load bar 21 is restrained from the inward movement in the radial direction of the magnetic recording disk 13. In this manner, the flying head slider 18 can be kept distanced from the surface of the magnetic recording disk 13 when the magnetic recording disk 13 stands still. To the contrary, when the flying head slider 18 moves in the inward direction, the load bar 21 is allowed to move downward along the slant 23. The load bar 21 can finally be released from the support of the slant 23, namely, the ramp member 22. Here, a combination of the load bar 21 and the ramp member 22 establishes a load/unload mechanism.

Figure 3:
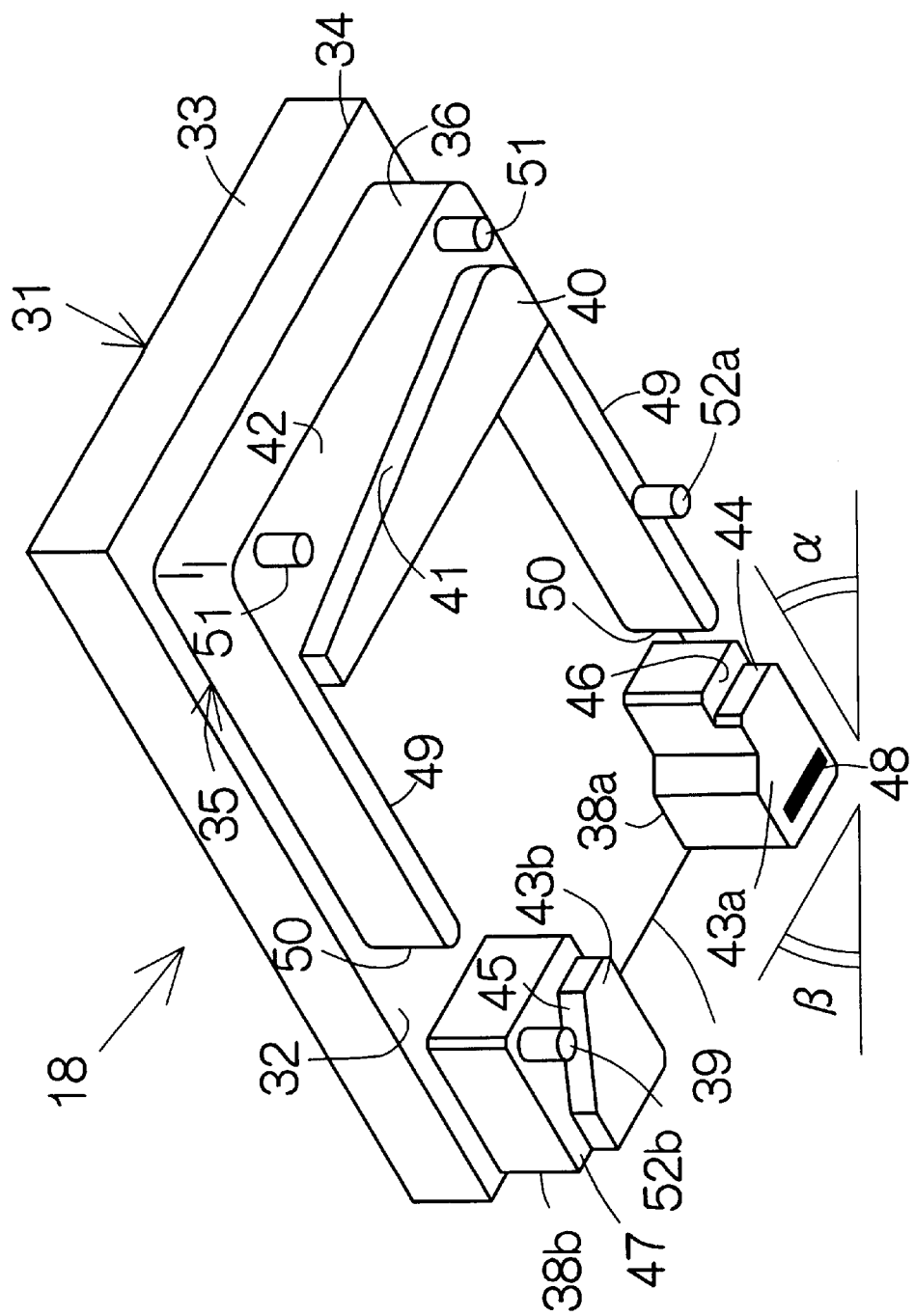
FIG. 3 is an enlarged perspective view illustrating the structure of a flying head slider according to a first embodiment of the present invention.

FIG. 3 illustrates a specific example of the flying head slider 18 according to a first embodiment of the present invention in detail. The flying head slider 18 includes a slider body 31 of a flat parallelepiped, for example. The slider body 31 is designed to oppose its flat bottom surface 32 to the magnetic recording disk 13. When the magnetic recording disk 13 rotates, an airflow is first received on a front surface 33 of the slider body 31. An edge or ridgeline defined between the front surface 33 and the bottom surface 32 corresponds to the upstream or leading end 34 of the bottom surface 32.

A front rail 35 is formed to stand on the bottom surface 32 of the slider body 31 at an upstream or windward position closer to the leading end 34 of the bottom surface 32. The front rail 35 is designed to extend in the lateral direction of the slider body 31 in parallel with the leading end 34 of the bottom surface 32 The thickness of the front rail 35 may be set at 1.5–2.0 μm, for example. A front surface 36 is defined on the front rail 35 so as to stand from the bottom surface 32 at a position retracted or distanced downstream from the leading end 34 of the bottom surface 32.

Likewise, a pair of rear rails 38a, 38b are formed to stand on the bottom surface 32 of the slider body 31 at a downstream or leeward position closer to a downstream or trailing end of the bottom surface 32. The rear rails 38a, 38b are arranged in a row in the lateral direction so to as define an airflow passage 39 therebetween. The rear rails 38a, 38b are designed to extend downstream in the rearward direction toward the trailing end of the bottom surface 32. The thickness of the respective rear rails 38a, 38b may be set at a predetermined thickness equal to the aforementioned thickness of the front rail 35.

A front air bearing surface 40 in the form of a strip is defined on the top surface of the front rail 35 so as to extend in the lateral direction of the slider body 31. A step 41 is defined on the top surface of the front rail 35 at the upstream or leading end of the front air bearing surface 40. As is apparent from FIG. 3, the step 41 may be formed all over the periphery of the front air bearing surface 40 except the downstream or trailing end thereof. The step 41 serves to define a lower surface 42 extending over the top surface of the front rail 35 at a level lower than the front air bearing surface 40. During rotation of the magnetic recording disk 13, an airflow generated along the surface of the magnetic recording disk 13 is allowed to flow along the lower surface 42, the step 41 and the front air bearing surface 40 in this sequence. The step 41 enables generation of a larger positive pressure or lift on the front air bearing surface 40.

First and second rear air bearing surfaces 43a, 43b are respectively defined on the top surfaces of the rear rails 38a, 38b. The first and second rear air bearing surfaces 43a, 43b are arranged in a row in the lateral direction of the slider body 31 so as to interpose the airflow passage 39 therebetween. A step 44 is defined on the top surface of the rear rail 38a at the upstream or leading end of the first rear air bearing surface 43a. Likewise, a step 45 is defined on the top surface of the rear rail 38b at the upstream or leading end of the second rear air bearing surface 43b. As shown in FIG. 3, the step 45 may be formed to extend along the periphery of the second rear air bearing surface 43b toward the downstream or trailing end of the second rear air bearing surface 43b. The steps 44, 45 serve to define lower surfaces 46, 47 extending over the top surfaces of the rear rails 38a, 38b, respectively, at a level lower than the first and second rear air bearing surfaces 43a, 43b. During rotation of the magnetic recording disk 13, an airflow generated along the surface of the magnetic recording disk 13 is allowed to flow along the lower surfaces 46, 47, the steps 44, 45 and the first and second rear air bearing surfaces 43a, 43b in this sequence.

The steps 44, 45 enable generation of a larger positive pressure or lift on the first and second air bearing surfaces 43a, 43b, respectively.

The flying head slider 18 of this type allows generation of a larger positive pressure or lift on the front air bearing surface 40 rather than a combination of the first and second rear air bearing surfaces 43a, 43b. Accordingly, when the slider body 31 flies above the surface of the magnetic recording disk 13, the slider body 31 keeps the attitude of a pitch angle $\alpha$. The pitch angle $\alpha$ is defined as an inclined angle in the direction of the airflow, namely, in the back-and-forth direction of the slider body 31. In addition, the first rear air bearing surface 43a is set smaller than the second rear air bearing surface 43b, so that a larger positive pressure or lift can be generated on the second rear air bearing surface 43b rather than the first rear air bearing surface 43a when the airflow acts on the slider body 31. Accordingly, when the slider body 31 flies above the surface of the magnetic recording disk 13, the slider body 31 is allowed to keep the attitude of a roll angle $\beta$. The roll angle $\beta$ is defined as an inclined angle in a direction perpendicular to the direction of the airflow, namely, in the lateral direction of the slider body 31.

A magnetic head element embedded in the slider body 31 is allowed to expose its read/write gaps 48 at the first rear air bearing surface 43a. A combination of the pitch and roll angles $\alpha$, $\beta$ serves to minimize the distance between the slider body 31 and the surface of the magnetic recording disk 13 at a position around the read/write gaps 48. Consequently, the magnetic head element can read and write a magnetic information data into and out of the magnetic recording disk 13 in an efficient manner. The magnetic head element may include a write head element such as a thin film magnetic head utilizing a thin film coil pattern, for example, and a read head element such as a giant magnetoresistive (GMR) element, a tunnel-junction magnetoresistive (TMR) element, and the like.

A pair of side rails 49 are formed to stand on the bottom surface 32 of the slider body 31. The respective side rails 49 are connected to the front rail 35 at its opposite ends in the lateral direction of the slider body 31 so as to extend toward the trailing end of the bottom surface 32. The side rails 49 are designed to prevent an airflow, which collides against the front rail 35 during rotation of the magnetic recording disk 13, from entering a space behind the front rail 35 even when the airflow flows around the opposite ends of the front rail 35. The airflow flowing beyond the front rail 35 across the front air bearing surface 40 is thus easily expanded in the vertical direction upright to the surface of the magnetic recording disk 13. The expansion of the airflow serves to generate a negative pressure behind the front rail 35. The aforementioned lift of the slider body 31 is balanced with the negative pressure so as to set the flying height of the slider body 31 above the surface of the magnetic recording disk 13. Recesses 50 are defined between the side rails 49 and the corresponding rear rails 38a, 38b, respectively. The recesses 50 serve to introduce the airflow having flowed around the opposite ends of the front rail 35 into the airflow passage 49 between the rear rails 38a, 38b. The side rails 49 define the top surfaces, respectively, leveled or flush with the lower surface 42 on the front rail 35.

As is apparent from FIG. 3, a pair of protrusions, namely, front adsorption prevention pads 51 are formed on the front rail 35 so as to stand on the lower surface 42. The front adsorption prevention pads 51 are preferably located adjacent the leading end of the bottom surface 32 as close as possible. The front adsorption prevention pads 51 define the top surfaces, respectively, higher than the front air bearing surface 40 as well as the first and second rear air bearing surfaces 43a, 43b.

Likewise, a protrusion, namely, a first rear adsorption prevention pad 52a is formed on the side rail 49 closer to the first rear air bearing surface 43a so as to stand on the top surface of the side rail 49, while a protrusion, namely, a second rear adsorption prevention pad 52b is formed on the rear rail 38b so as to stand on the lower surface 47. The rear adsorption prevention pads 52a, 52b are located at positions distanced upstream from the trailing end of the bottom surface 32. The rear adsorption prevention pads 52a, 52b define the top surfaces, respectively, higher than the front air bearing surface 40 as well as the first and second rear air bearing surfaces 43a, 43b, in the same manner as the aforementioned front adsorption prevention pads 51.

Even when the slider body 31 is seated on the surface of the magnetic recording disk 13, the front and rear adsorption prevention pads 51, 51a, 51b serve to keep the front and rear air bearing surfaces 40, 43a, 43b distanced apart from the surface of the magnetic recording disk 13. The contact area can be minimized between the slider body 31 and the surface of the magnetic recording disk 13. A smaller adsorption or effect of meniscus is only allowed to act on the slider body 31 from a lubricating agent or oil spreading over the surface of the magnetic recording disk 13. Moreover, since the rear adsorption prevention pads 52a, 52b are located distanced upstream from the trailing end of the bottom surface 32 in the aforementioned manner, the read/write gaps 48 can be kept at a position closest to the surface of the magnetic recording disk 13 without inducing collision between the rear adsorption prevention pads 52a, 52b and the magnetic recording disk 13 even when the slider body 31 takes the aforementioned attitude of the pitch angle α during flight.

Figure 4:
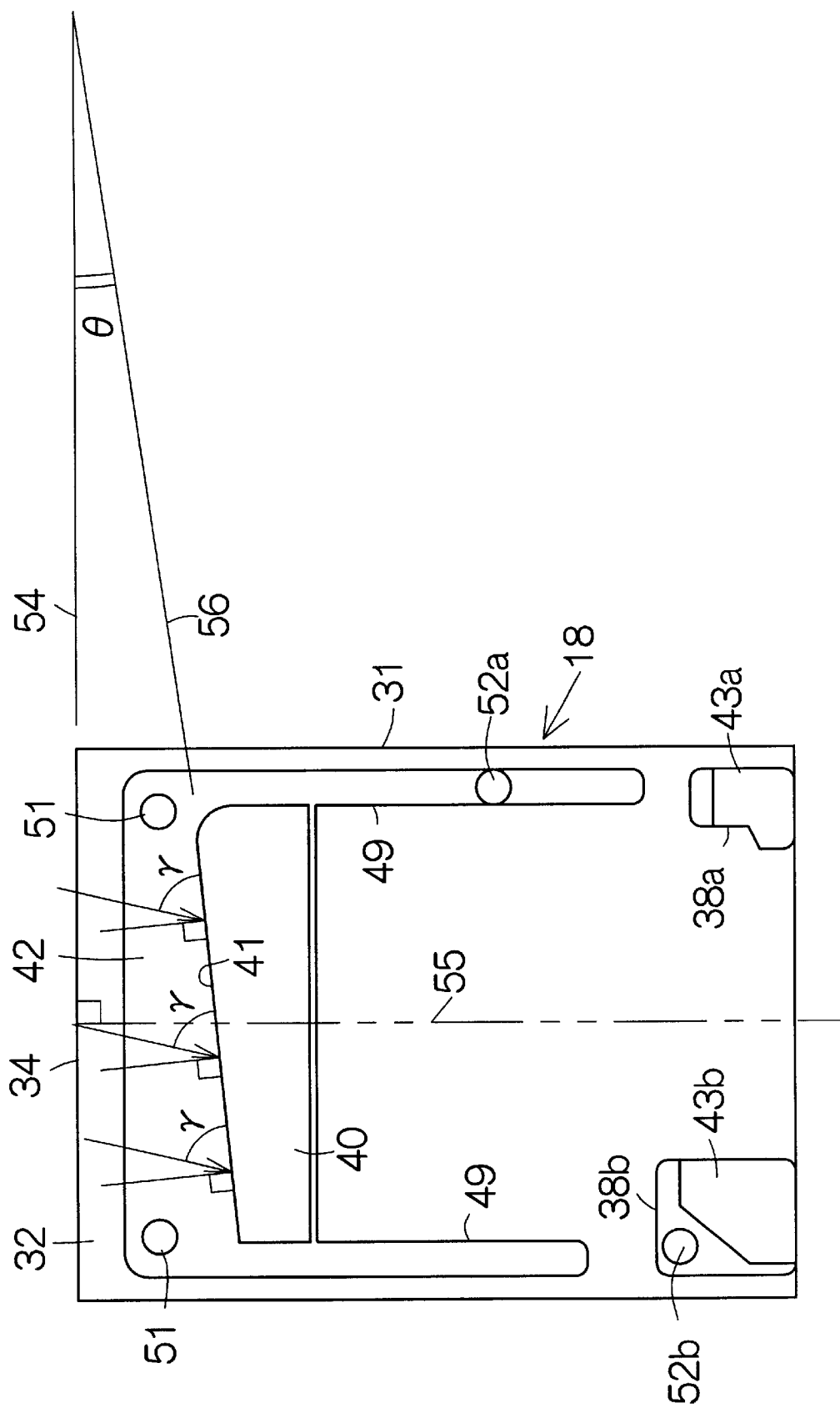
FIG. 4 is a plan view schematically illustrating a medium-opposed surface or bottom surface of a slider body.

As is apparent from FIG. 4, the ridgeline defining the leading end 34 of the bottom surface 32 is designed to extend along a first datum line 54 in the lateral direction of the slider body 31. The first datum line 54 is define to intersect the longitudinal centerline 55 of the slider body 31 at a right angle. On the other hand, the leading end of the front air bearing surface 40 is designed to extend along a second datum line 56 intersecting the first datum line 54 at a predetermined inclined angle θ. In the flying head slider 18 of this type, the slider body 31 is allowed to take the attitude of a larger pitch angle α as an incidence angle γ of an airflow colliding against the step 42 in front of the front air bearing surface 40 gets decreased.

When the magnetic recording disk 13 stands still, the tip end of the head suspension 19 is positioned outside the magnetic recording disk 13 based on the swinging movement of the swinging arm 17. The load bar 21 at the tip end of the head suspension 19 is received on the ramp member 22. The elastic bending induced in the head suspension 19 brings the flying head slider 18 into a position distanced from the surface of the magnetic recording disk 13. Without an airflow, the contact can be prevented between the flying head slider 18 and the magnetic recording disk 13.

When the HDD 11 receives instructions for writing or reading information data, the spindle motor 14 starts to drive the magnetic recording disk 13 for rotation. An airflow can thus be generated along the surface of the rotating magnetic recording disk 13. When the magnetic recording disk 13 subsequently has reached the steady state, the swinging arm 17 is driven to swing in the inward direction toward the rotational shaft of the spindle motor 14. As is apparent from FIG. 2, for example, the load bar 21 is forced to get out of the depression 24 so as to move downward along the slant 23 on the ramp member 22.

During the downward movement of the load bar 21, the flying head slider 18 starts receiving the airflow. In the case where the flying head slider 18 is allowed to stably take a predetermined normal attitude, namely, a horizontal attitude when the load bar 21 drops off the ramp member 22, a predetermined positive pressure or lift can be generated on the front air bearing surface 40 as well as the first and second rear air bearing surfaces 43a, 43b. The lift is balanced with a larger negative pressure generated behind the front rail 35. The flying head slider 18 keeps flying above the surface of the magnetic recording disk 13 without touching the magnetic recording disk 13 even after the load bar 21 is released from the support of the ramp member 22. The magnetic head element is allowed to achieve the read/write operation through the exposed read/write gaps 48 during flight of the flying head slider 18.

Now, assume that the flying head slider 18 is forced to take an inclined attitude allowing the leading end to get closer to the surface of the magnetic recording disk 13 as compared with the predetermined normal or horizontal attitude. If the load bar 21 drops off the ramp member 22 with the flying head slider 18 taking the inclined attitude, the airflow flows along the front surface 33 of the slider body 31 and the bottom surface 32 so as to act on the front surface 36 of the front rail 35. A larger lift can thus be generated at the leading end of the slider body 31. This larger lift at the leading end forces the flying head slider 18 back to the horizontal attitude. Thereafter, the flying head slider 18 is thus allowed to keep flying in the aforementioned manner. If the front surface 36 of the front rail 35 is flush with the front surface 33 of the slider body 31, an enough lift cannot be generated at the leading end of the slider body 31. A larger negative pressure behind the front rail 35 overcomes the lift at the leading end, so that the flying head slider 18 involuntarily collides against the surface of the magnetic recording disk 13.

In general, an inclined attitude deviated from the predetermined normal attitude may be established during an assembling process, specifically, when the head suspension 19 is attached to the swinging arm 17 as well as when the flying head slider 18 is fixed to the head suspension 19. A still higher accuracy is usually required in the assembling process so as to avoid establishment of the inclined attitude. On the other hand, according to this embodiment, it is possible to reliably prevent the flying head slider 18 from colliding against the magnetic recording disk 13 irrespective of establishment of the inclined attitude, when the load bar 21 is released from the support of the ramp member 22, as compared with a conventional flying head slider. The accuracy in the assembling process may be loosened as compared with the conventional flying head slider. The assembling process can be facilitated. Moreover, the yield factor can be improved.

A minimum flow rate of the airflow is established on the surface of the rotating magnetic recording disk 13 in the vicinity of the rotational axis, while a maximum flow rate is likewise established near the outer periphery. The flow rate of the airflow on the rotating magnetic recording disk 13 gets higher as it approaches the outermost recording track from the innermost recording track. The pitch angle α should be kept constant in the flying head slider 18 during flight irrespective of variation in the flow rate of the airflow. However, the front surface 36 retracted from the leading end 34 inevitably serves to increase the pitch angle α in the flying head slider 18 as the flow rate of the airflow gets higher. According to the embodiment, since the incidence angle γ of the airflow colliding against the step 42 gets smaller as the flying head slider 18 shifts from the innermost recording track to the outermost recording track, it is possible to suppress the increase in the pitch angle α irrespective of the increase in the flow rate of the airflow. The variation in the pitch angle α can be suppressed to the utmost between the innermost and outermost recording tracks. The stabilized pitch angle α in this manner also leads to stabilization of the flying height of the flying head slider 18.

When the read/write operation has been completed, the swinging arm 17 is driven to swing in the outward direction toward the ramp member 22 outside the outer periphery of the magnetic recording disk 13. The load bar 21 is caused to climb up the slant 23 on the ramp member 22. A bending is induced in the head suspension 19, so that the flying head slider 18 can be distanced from the surface of the magnetic recording disk 13. When the load bar 21 has completely climbed up the slant 23 so as to enter the depression 24, the inward movement of the load bar 21 can be restrained. The flying head slider 18 can thus be kept distanced from the surface of the magnetic recording disk 13 in this manner. The magnetic recording disk 13 thereafter stops rotating.

Next, a brief description will be made on the production process of the flying head slider 18. As conventionally known, a plurality of magnetic head elements are formed over the surface of a wafer, not shown. The wafer may include an $Al_2O_3$-TiC body covered with an $Al_2O_3$ lamination. A plurality of blocks are defined on the wafer so as to receive the individual magnetic head element. Each block is expected to finally correspond to the individual flying head slider 18. For example, 100×100=10,000 of the flying head sliders 18 can be cut out of a single wafer of 5 inches diameter. The formed magnetic head elements are covered with an $Al_2O_3$ layer. In this manner, the magnetic head elements embedded in the $Al_2O_3$ layer of 50 μm thickness can be obtained on the wafer.

After the magnetic head elements have been formed, a wafer bar is cut out of the wafer so as to include the aforementioned blocks in a row. The cut or exposed surface of the wafer bar is thereafter subjected to formation of the bottom surfaces 31 for the respective blocks in a row. The flying head sliders 18 are finally cut out of the wafer bar in correspondence with the respective blocks.

Figure 5A:
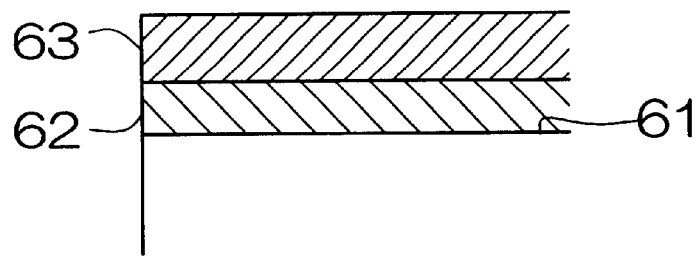
FIGS. 5A to 5C are an enlarged partial sectional view of a wafer bar schematically illustrating a process of fabricating the bottom surface.

In forming the bottom surface 31, a first diamond-like-carbon (DLC) layer 62 is formed on the exposed surface 61 of the wafer bar by a sputtering process and the like, as shown in FIG. 5A. The thickness of the first DLC layer 62 may be set at approximately 5.0 nm, for example. An Si or SiC cohesion layer of approximately 2.0 nm thickness may be interposed to couple the first DLC layer 62 with the exposed surface 61 of the wafer bar. The cohesion layer may be formed by a sputtering process, for example. The first DLC layer 62 is expected to serve as a protection layer for the exposed surface 61, namely, the bottom surface 31 of a resulting flying head slider 18. A second DLC layer 63 is further formed over the first DLC layer 62 with an Si or SiC cohesion layer interposed therebetween. The thickness of the second DLC layer 63 may be set at approximately 20 nm–40 nm, for example.

Figure 5B:
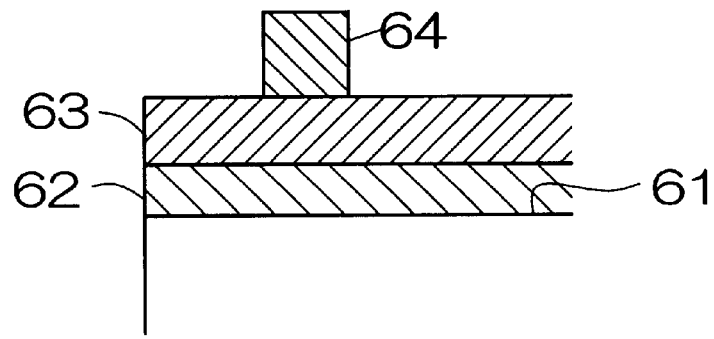
Figure 5C:
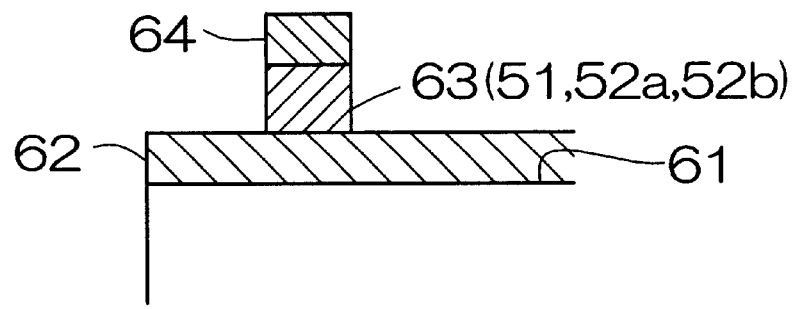

As shown in FIG. 5B, a photoresist 64 is formed on the surface of the second DLC layer 63 so as to define a pattern corresponding to the contour of the respective adsorption prevention pads 51, 52a, 52b. When a reactive ion etching (RIE) process is effected, the second DLC layer 63 along with the upper cohesion layer is removed around the photoresist 64. Consequently, the tip portions of the respective adsorption prevention pads 51, 52a, 52b are shaped out of the second DLC layer 63 below the photoresist 64, as shown in FIG. 5C.

Figure 6A:
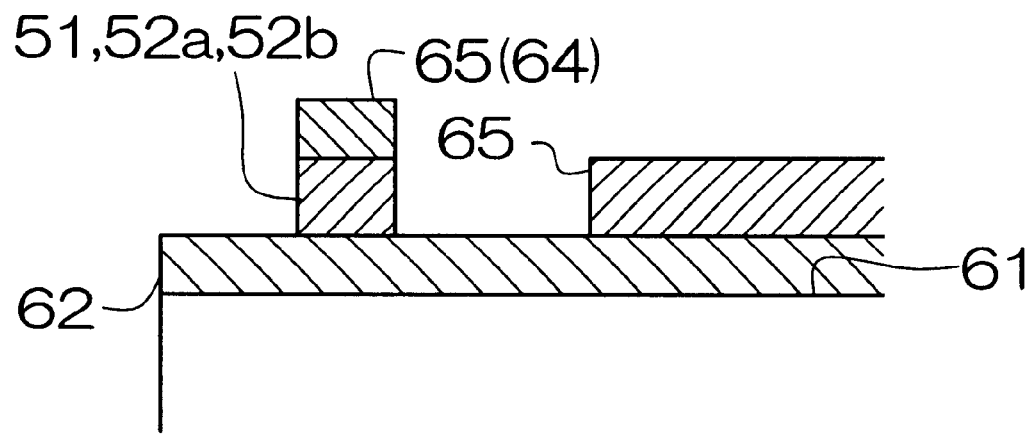
FIGS. 6A and 6B are an enlarged partial sectional view of the wafer bar schematically illustrating the process of fabricating the bottom surface.
Figure 6B:
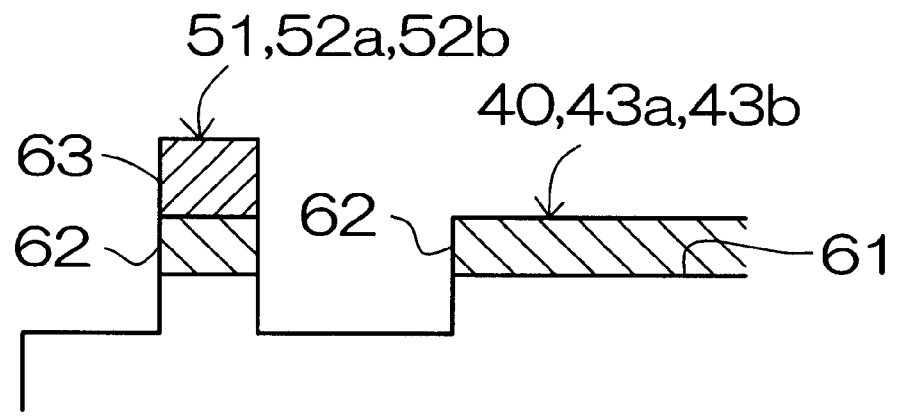

As shown in FIG. 6A, a photoresist 65 is then formed on the exposed surface of the first DLC layer 62 so as to define a pattern corresponding to the contour of the front air bearing surface 40 as well as the first and second rear air bearing surfaces 43a, 43b. When an ion milling process is effected, the first DLC layer 62 along with the lower cohesion layer as well as the $Al_2O_3$-TiC body of the wafer bar is removed around the photoresist 65. Consequently, the respective air bearing surfaces 40, 43a, 43b are shaped out of the first DLC layer 62 and the $Al_2O_3$-TiC body below the photoresist 65, as shown in FIG. 6B. The photoresist 65 is designed to pattern the leading end of the front air bearing surface 40 along a contour line intersecting a plane, including the end surface of the wafer bar receiving the magnetic head element, at a predetermined inclined angle θ.

When the air bearing surfaces 40, 43a, 43b have been formed in this manner, the formation of the adsorption prevention pads 51, 52a, 52b are completed at the same time. If the formed tip portions of the respective adsorption prevention pads 51, 52a, 52b are covered with the photoresist 64, 65 during the aforementioned ion milling process, the tip portions of the adsorption prevention pads 51, 52a, 52b are allowed to completely remain on the wafer bar.

Figure 7A:
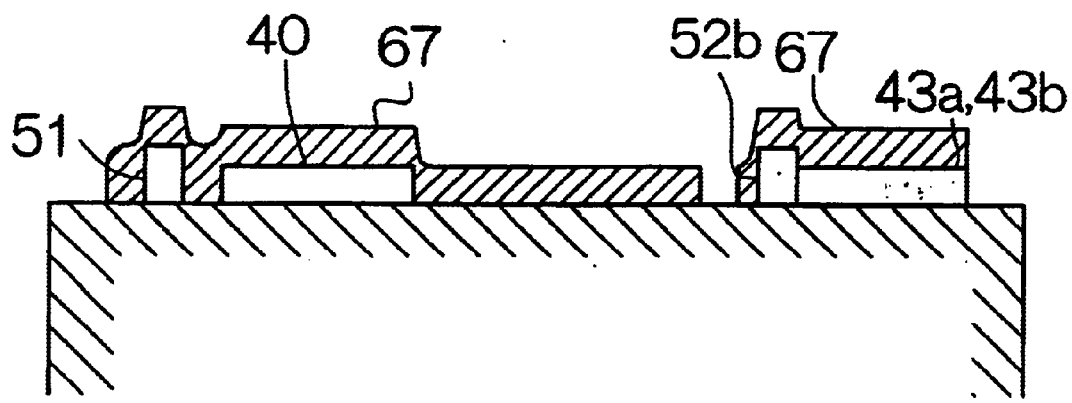
FIGS. 7A and 7B are an enlarged partial sectional view of the wafer bar schematically illustrating the process of fabricating the bottom surface.
Figure 7B:
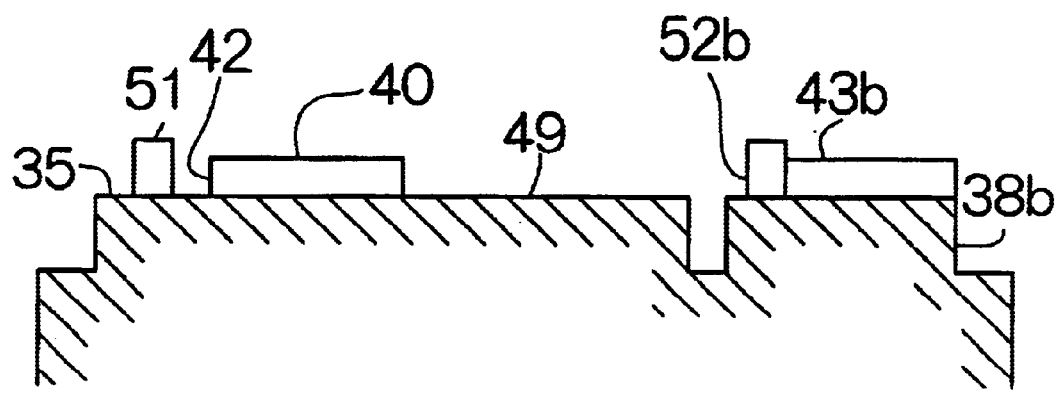

As shown in FIG. 7A, a photoresist 67 is then formed on the exposed surface 61 of the wafer bar so as to define a pattern corresponding to the contour of the front rail 35, the side rails 49 and the rear rails 38a, 38b. The photoresist 67 is designed to cover the formed air bearing surfaces 40, 43a, 43b as well as the formed adsorption prevention pads 51, 52a, 52b. When an ion milling process is effected, the $Al_2O_3$-TiC body of the wafer bar is further removed around the photoresist 67. Consequently, the front rail 35, the side rails 49 and the rear rails 38a, 38b are thus shaped out below the photoresist 67, as shown in FIG. 7B. The photoresist 67 is designed to pattern the leading end of the front rail 35 along a contour line retracted from the plane, including the end surface of the wafer bar receiving the magnetic head element, at a predetermined distance.

When the photoresist 67 has been removed, the front air bearing surface 40 as well as the first and second rear air bearing surfaces 43a, 43b, capped with the first DLC layer 62, are allowed to appear on the top surfaces of the front rail 35 and the rear rails 38a, 38b, respectively. At the same time, the adsorption prevention pads 51, 52a, 52b capped with the second DLC layer 63 are also allowed to appear on the top surfaces of the front rail 35, the side rail 49 and the rear rail 38b, respectively. The steps 42, 44, 45 are defined on the respective air bearing surfaces 40, 43a, 43b at their leading ends. In this manner, the formation of the bottom surface 31 can be finished for the respective blocks for the resulting flying head sliders 18.

Figure 8:
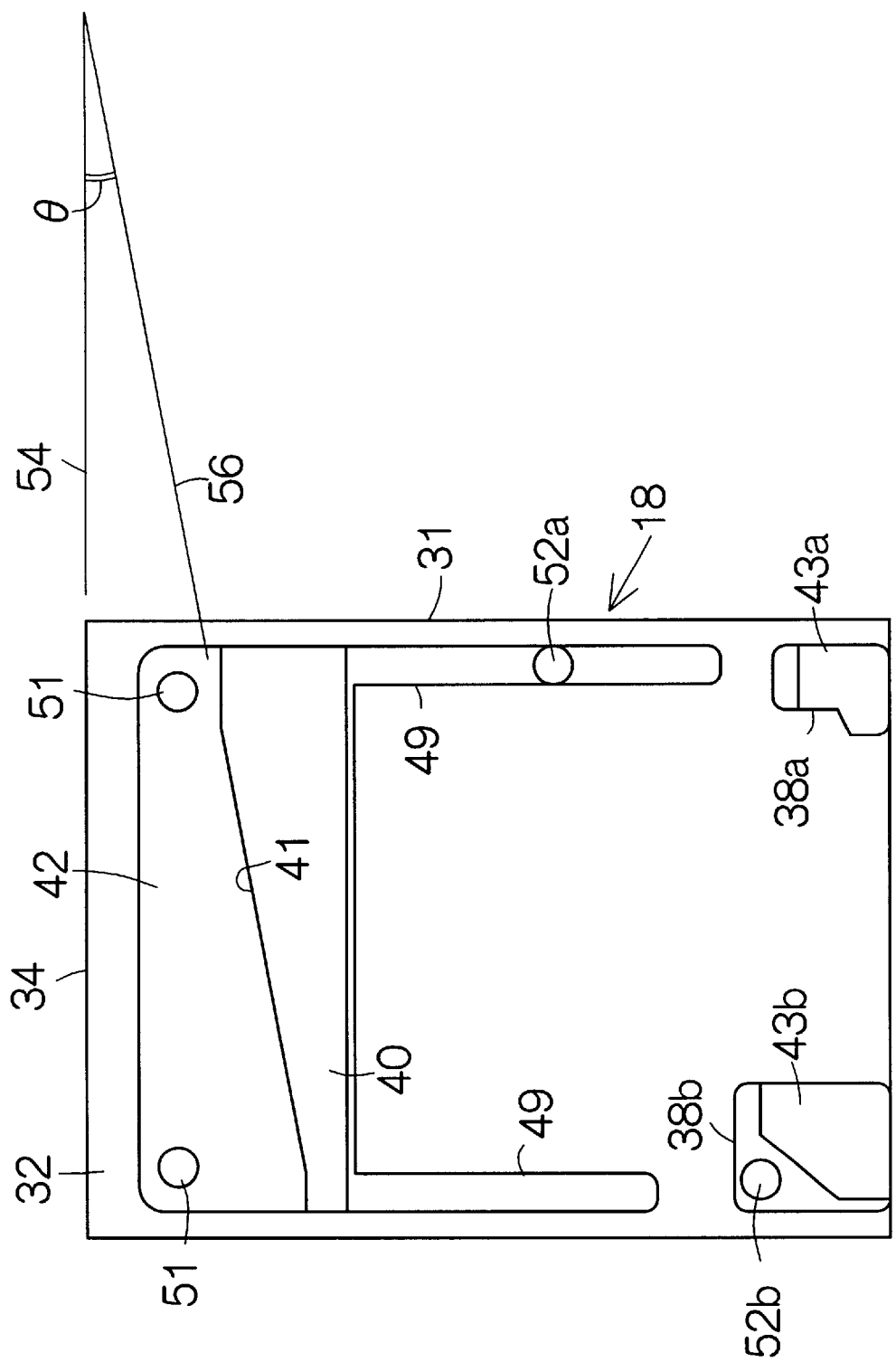
FIG. 8 is a plan view illustrating the bottom surface of a flying head slider according to a first modification of the first embodiment.

In defining the leading end of the front air bearing surface 40 along the second datum line 56 intersecting the first datum line 54 at the inclined angle θ in the aforementioned manner, the front air bearing surface 40 may reach the opposite ends of the front rail 35 in the lateral direction of the slider body 31, as shown in FIG. 8, for example. In this case, the front air bearing surface is designed to define the step 41 only at the upstream or leading end thereof.

Figure 9:
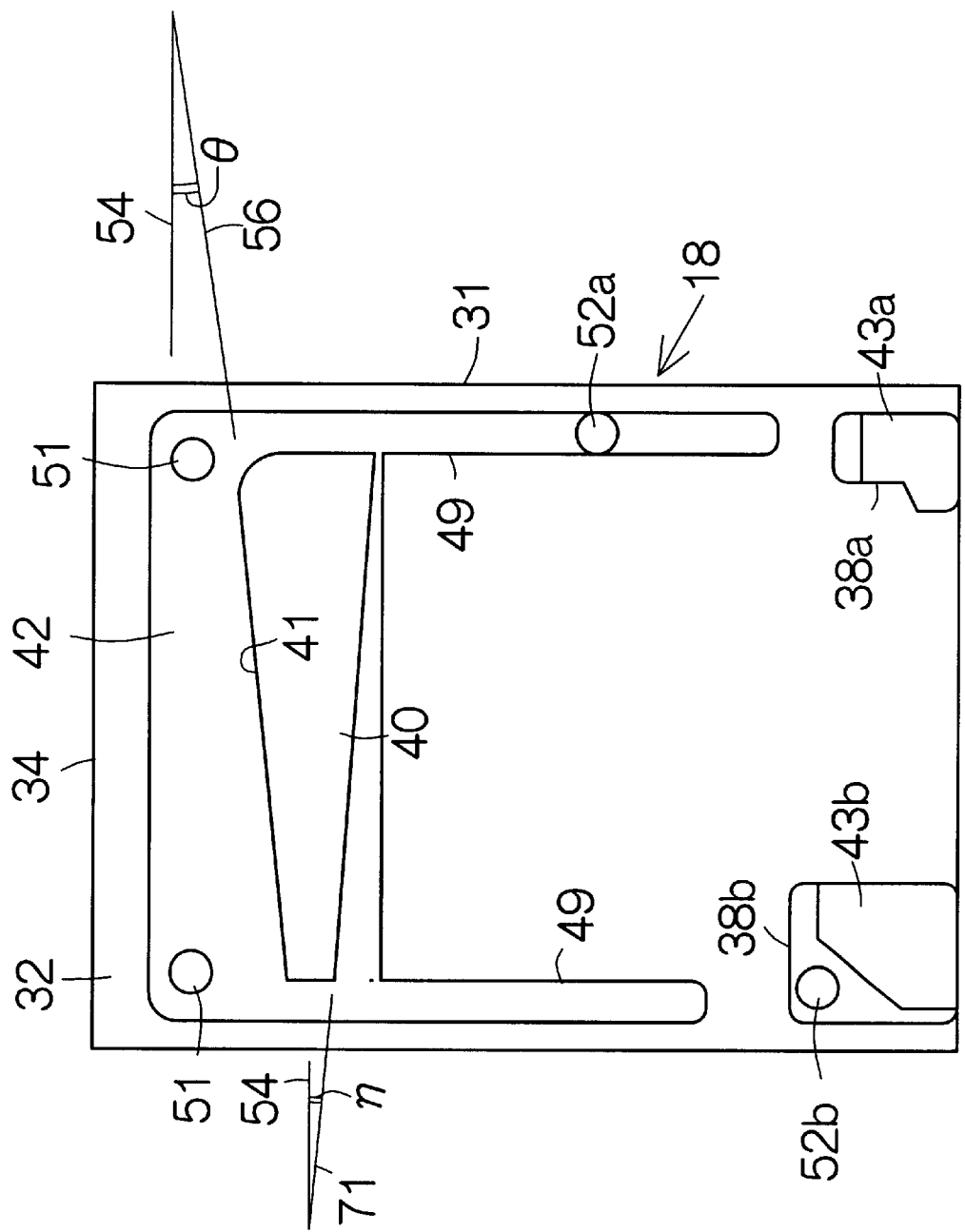
FIG. 9 is a plan view illustrating the bottom surface of a flying head slider according to a second modification of the first embodiment.
Figure 10:
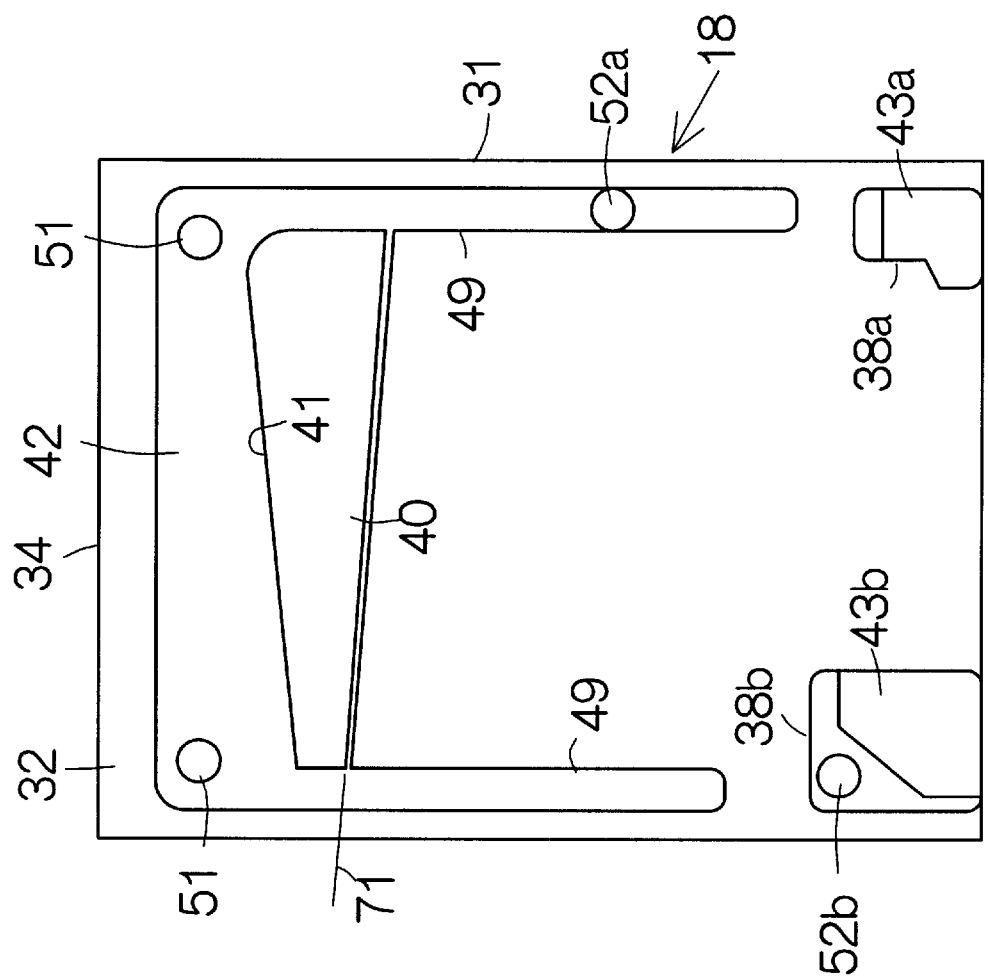
FIG. 10 is a plan view illustrating the bottom surface of a flying head slider according to a third modification of the first embodiment.

In addition, when the leading end of the front air bearing surface 40 is defined along the second datum line 56 in the aforementioned manner, a third datum line 71 may also be defined to pattern the downstream or leeward end of the front air bearing surface 40, as shown in FIG. 9, for example. The third datum line 71 may intersect the aforementioned first datum line 54 at a predetermined inclined angle η. In this case, the downstream or leeward end of the front rail 35 may also be defined along the third datum line 71, as shown in FIG. 10.

Figure 11:
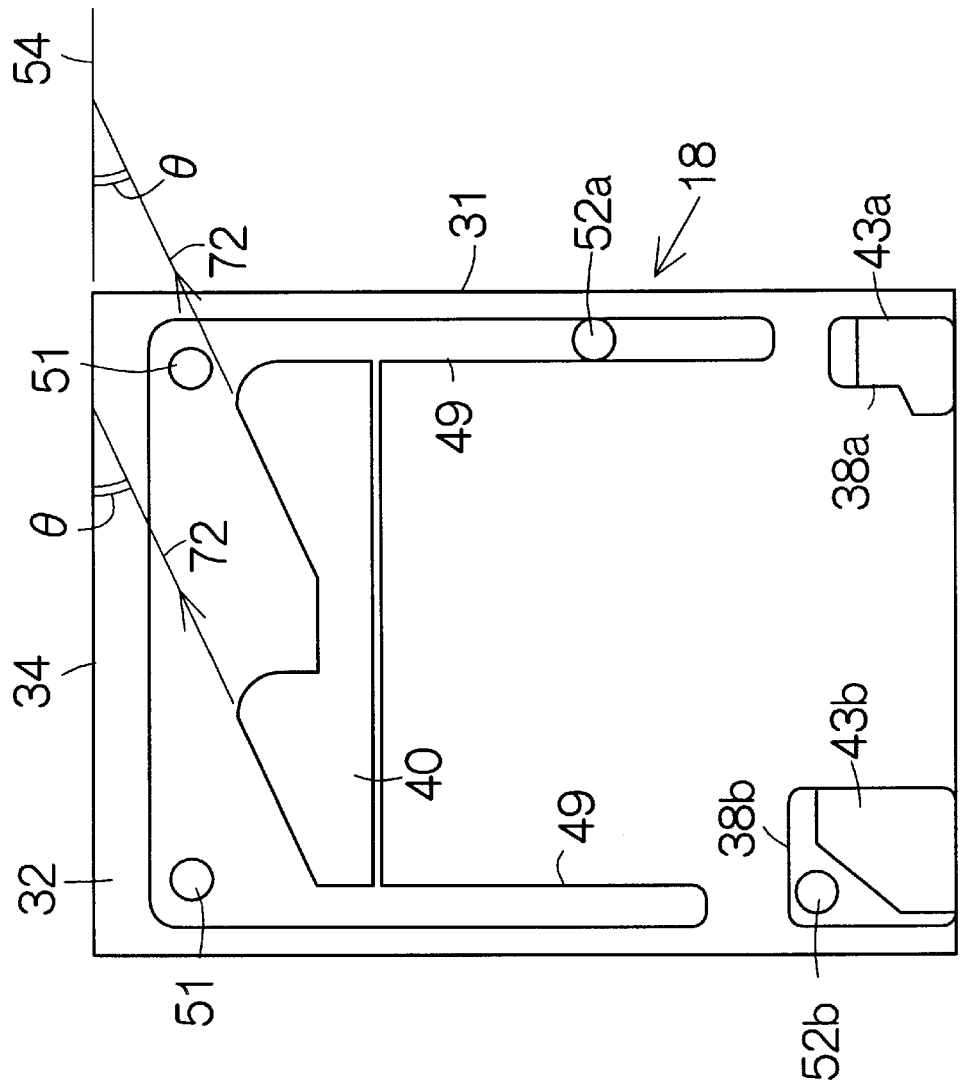
FIG. 11 is a plan view illustrating the bottom surface of a flying head slider according to a fourth modification of the first embodiment.
Figure 12:
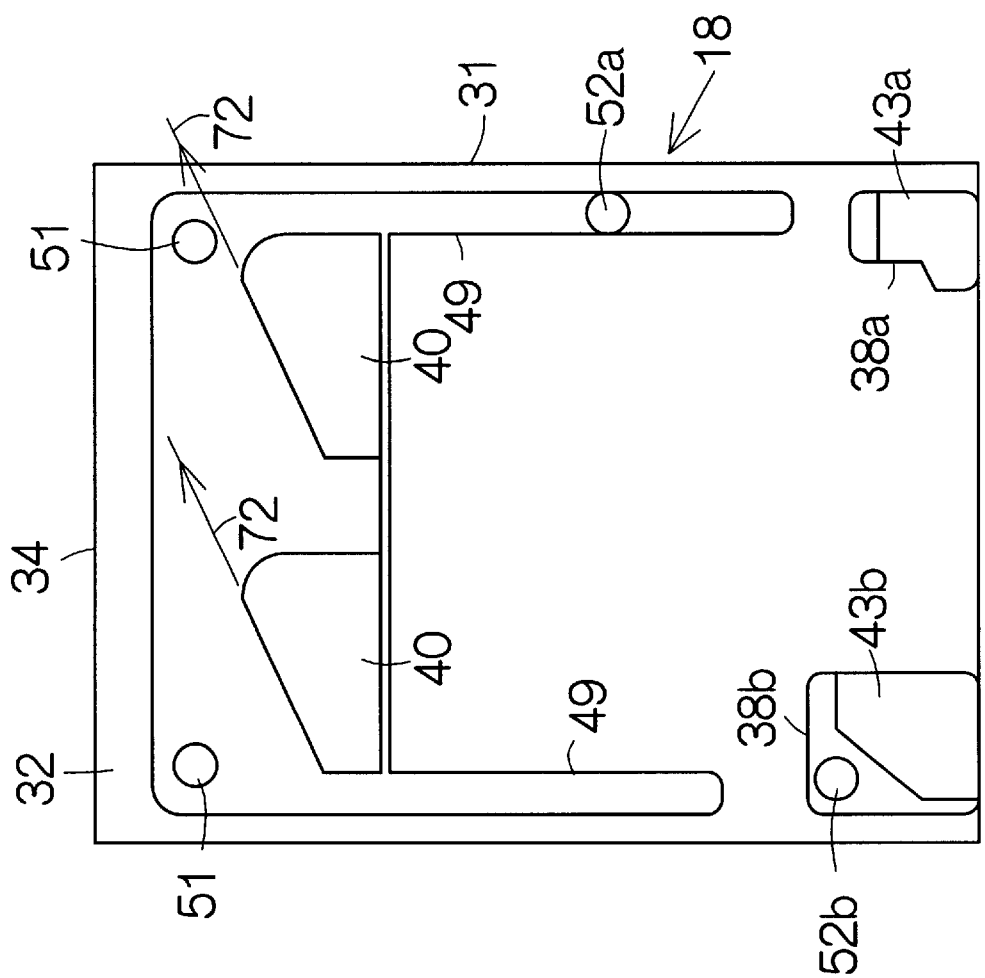
FIG. 12 is a plan view illustrating the bottom surface of a flying head slider according to a fifth modification of the first embodiment.
Figure 13:
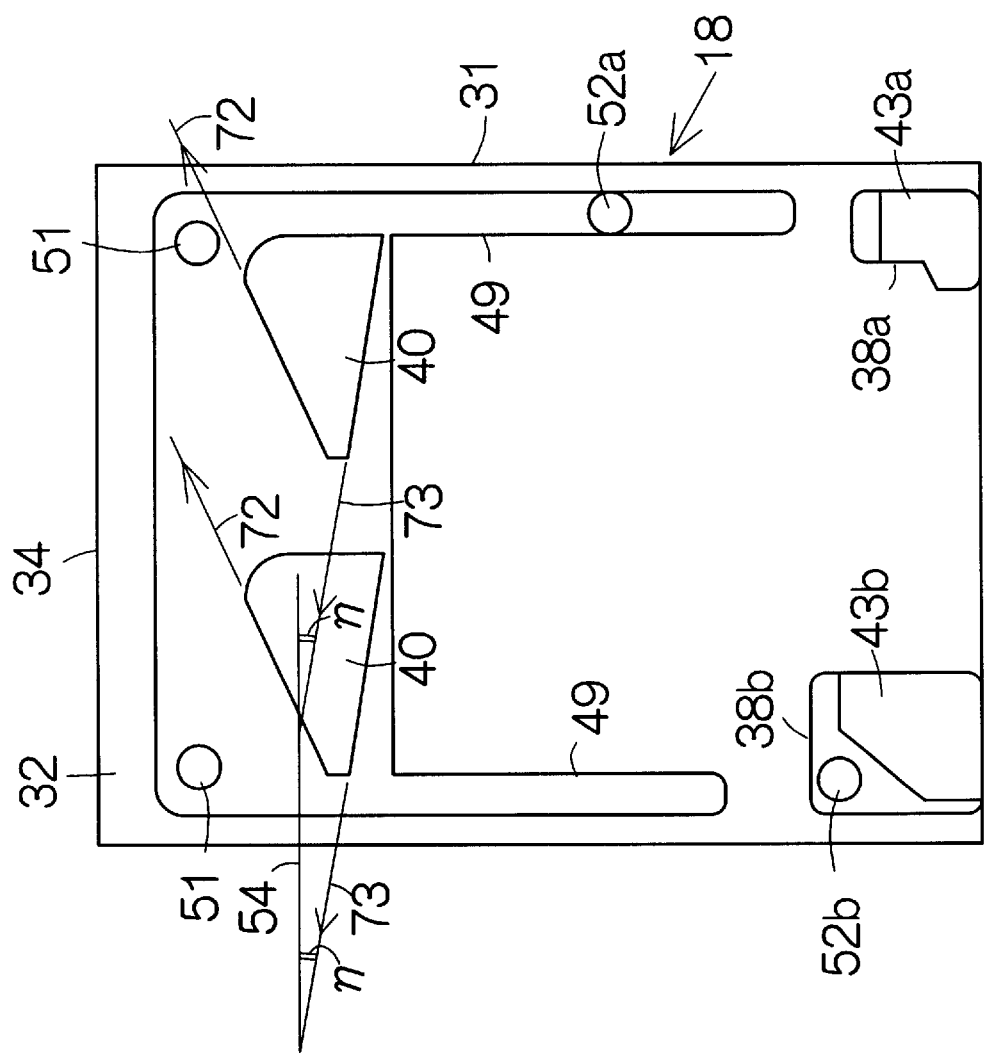
FIG. 13 is a plan view illustrating the bottom surface of a flying head slider according to a sixth modification of the first embodiment.

Otherwise, a pair of parallel second datum lines 72 may be employed to define the leading end of the front air bearing surface 40, as shown in FIG. 11, for example. The second datum lines 72 are designed to intersect the first datum line 54 at the inclined angle θ in the aforementioned manner. In this case, the front air bearing surface may be divided into sections 40, 40 corresponding to the respective second datum lines 72, as shown in FIG. 12. In the case where the front air bearing surface is divided into the sections 40, 40 in this manner, a pair of parallel third datum lines 73 intersecting the first datum line 54 at the inclined angle η may be employed to pattern the leading ends of the respective sections 40, 40 for the front air bearing surface, as shown in FIG. 13.

It should be noted that the front surface 36 of the front rail 35 needs not stand on the bottom surface at a position retracted or distanced downstream from the leading end 34 of the bottom surface 32 in any of the aforementioned flying head sliders 18. The front surface 36 of the front rail 35 may be flush with the front surface 33 of the slider body 31 in some cases.

Figure 14:
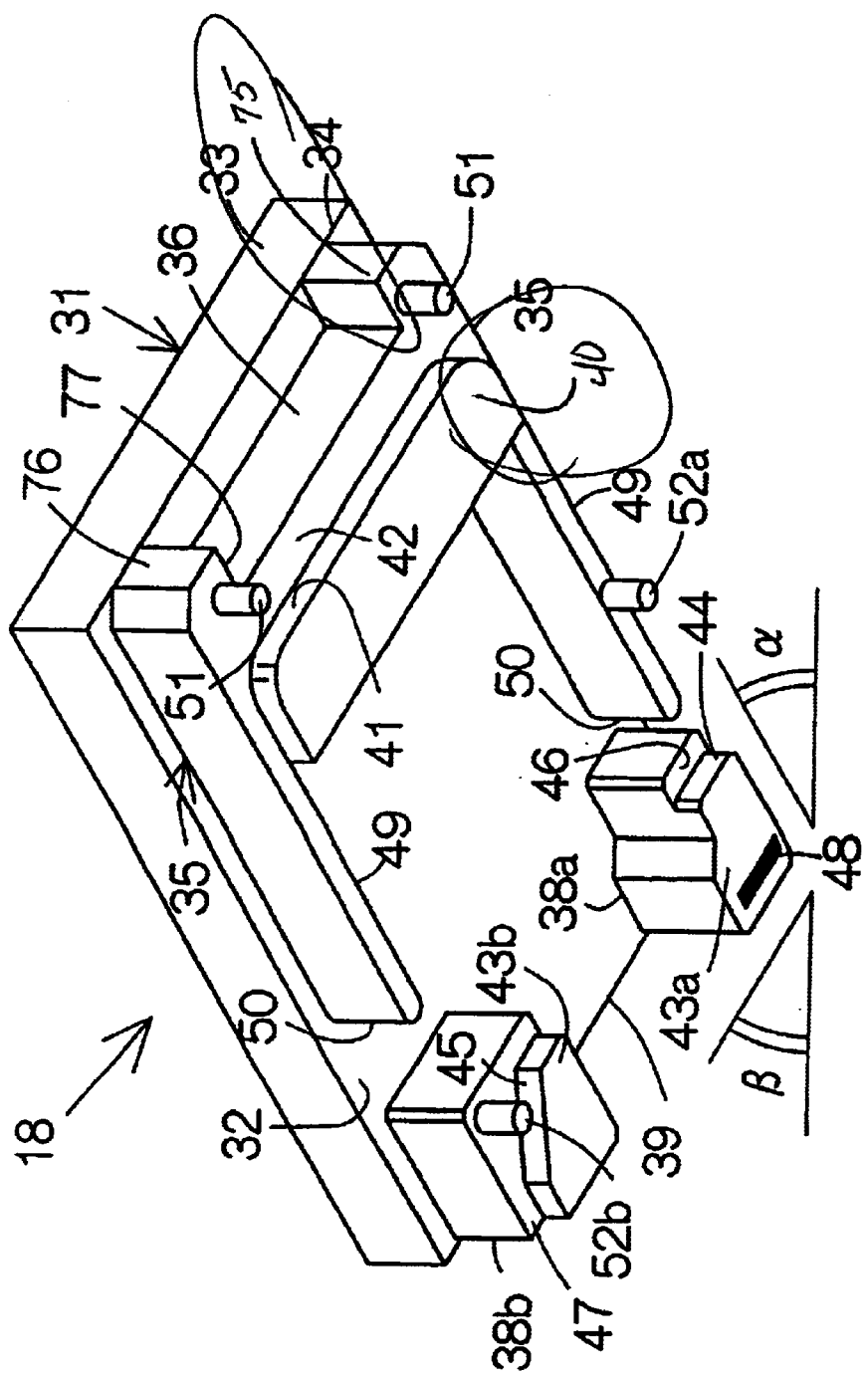
FIG. 14 is an enlarged perspective view illustrating the structure of a flying head slider according to a second embodiment of the present invention.

FIG. 14 schematically illustrates the structure of the flying head slider 18 according to a second embodiment of the present invention. The flying head slider 18 of this type includes first and second columnar pieces 75, 76 integral to a front rail 35 to swell forward from a front surface 36 standing from a bottom surface 32 at a position retracted or distanced downstream from the leading end 34 of the bottom surface 32. The first columnar piece 75 is designed to stand on the bottom surface 32 along the front surface 36 at an end of the front rail 35 in the lateral direction of a slider body 31, for example. The second columnar piece 76 is likewise designed to stand on the bottom surface 32 along the front surface 36 at the other end of the front rail 35 in the lateral direction of the slider body 31. An air clogging dished space 77 is defined between the first and second columnar pieces 75, 76 adjacent the front surface 36. The first and second columnar pieces 75, 76 enables a stabilized pitch angle α of the slider body 31 during a shift between the innermost and outermost recording tracks on the magnetic recording disk 13, in place of the aforementioned leading end extending along the second datum line 56. Like reference numerals are attached to structures identical or equivalent to those of the aforementioned first embodiment.

Figure 15:
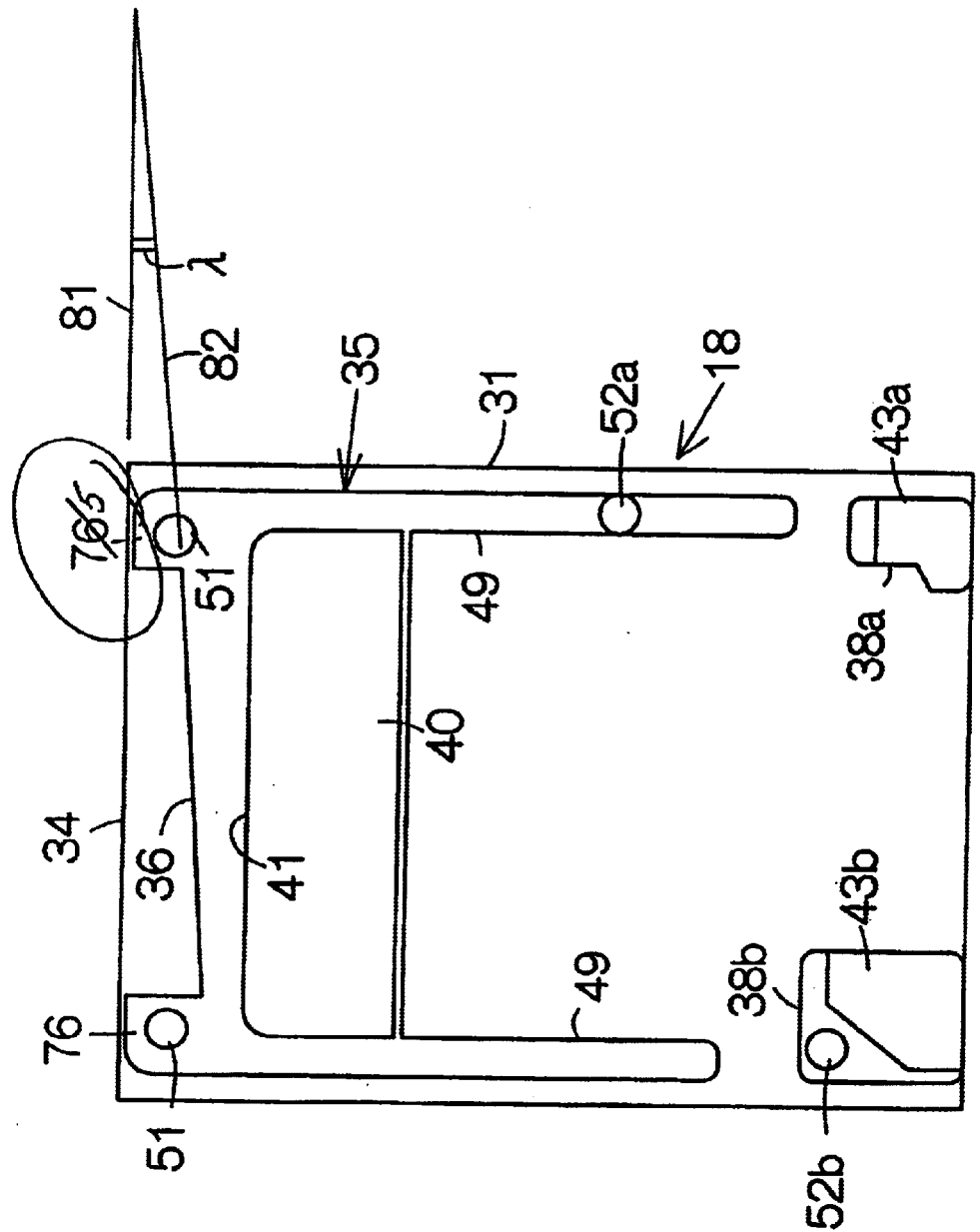
FIG. 15 is a plan view illustrating the bottom surface of a flying head slider according to a first modification of the second embodiment.
Figure 16:
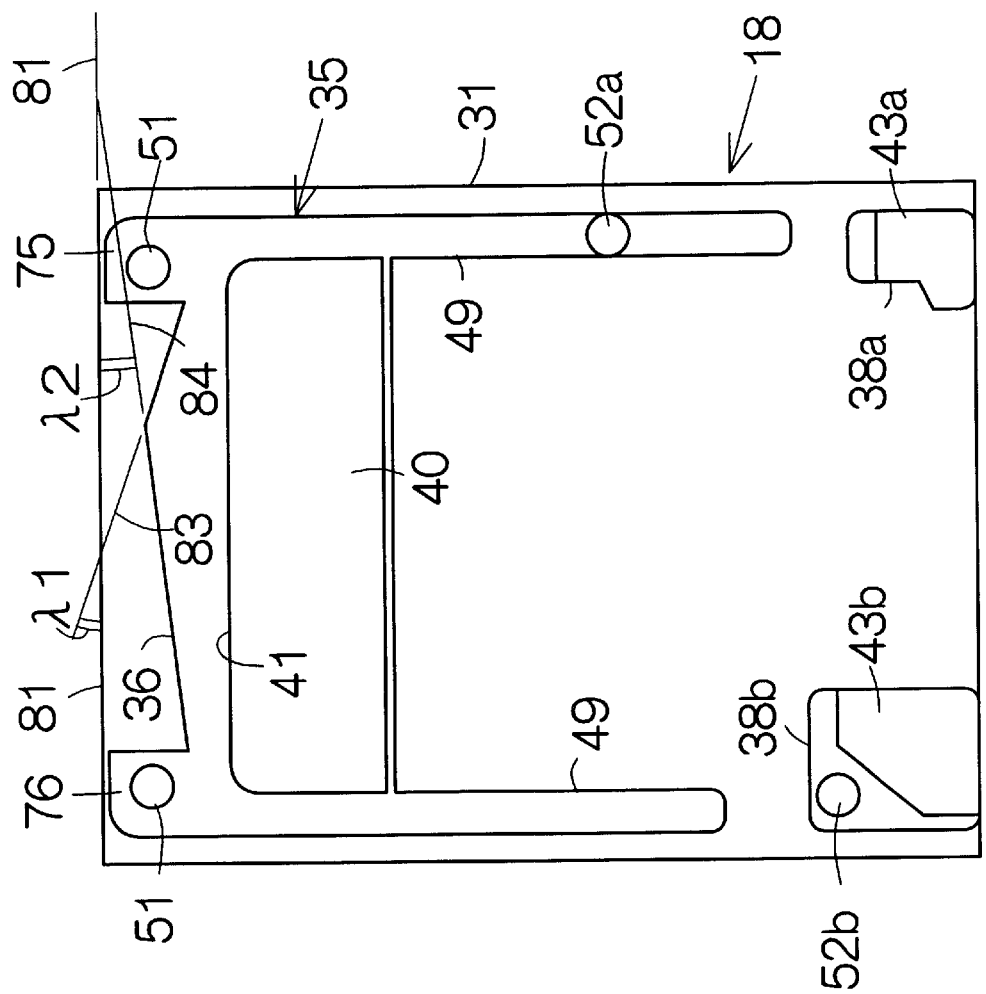
FIG. 16 is a plan view illustrating the bottom surface of a flying head slider according to a second modification of the second embodiment.
Figure 17:
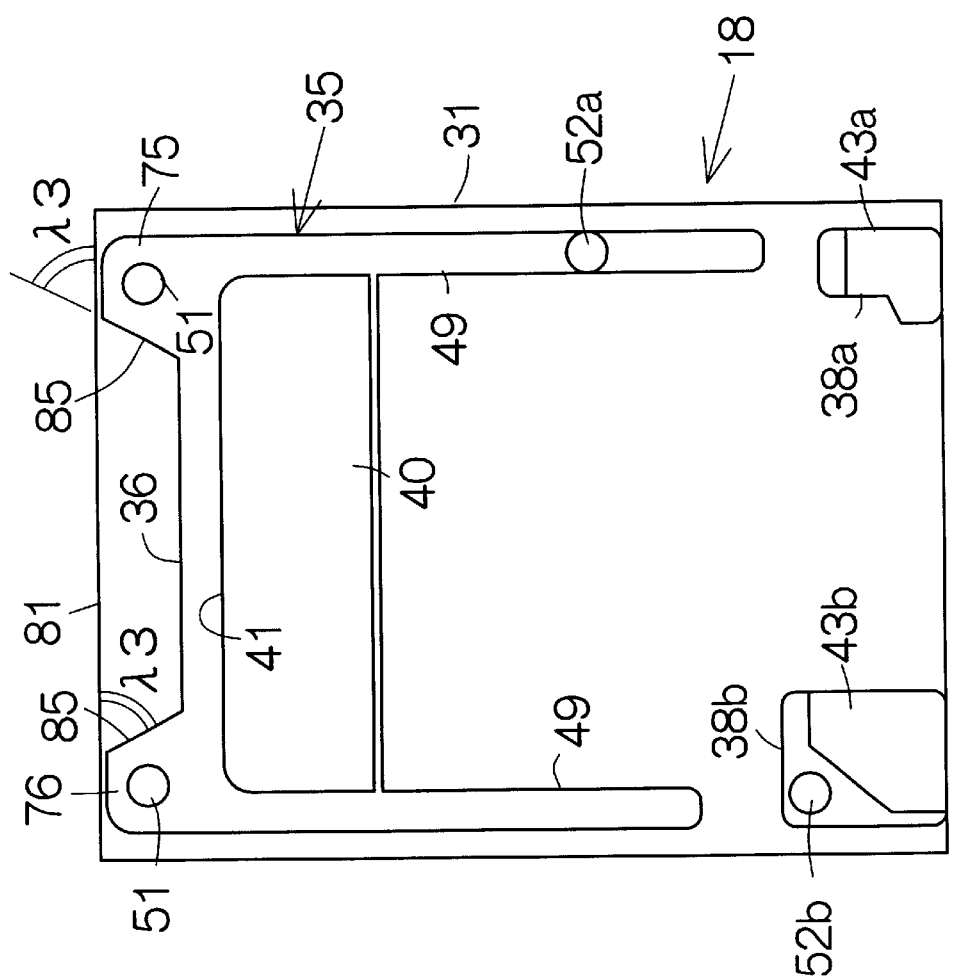
FIG. 17 is a plan view illustrating the bottom surface of a flying head slider according to a third modification of the second embodiment.

In the case where the columnar pieces 75, 76 are formed on the front surface 36 in the aforementioned manner, a first datum plane 82 may be employed to define the front surface 36 of the front rail 35 between the first and second columnar pieces 75, 76, as shown in FIG. 15, for example. The first datum plane 82 is designed to intersect a plane 81, including the front end surface of the slider body 31, at a predetermined inclined angle λ. Alternatively, first and second datum planes 83, 84 may be employed to define the front surface 36 of the front rail 35 between the first and second columnar pieces 75, 76, as shown in FIG. 16, for example. The first datum plane 83 is designed to intersect the plane 81, including the front end surface of the slider body 31, at a predetermined inclined angle λ1. The second datum plane 84 is likewise designed to intersect the plane at a predetermined inclined angle λ2. The first and second datum planes 83, 84 serve to define continuous planar sections over the front surface 36 of the front rail 35. Otherwise, oblique planes 85, 85 may be defined on the surfaces of the columnar pieces 75, 76, respectively, adjacent the front surface 36 of the front rail 35, as shown in FIG. 17. The oblique planes 85, 85 may be designed to intersect the plane 81, including the front end surface of the slider body 31, at a predetermined inclined angle λ3, for example.

Figure 18:
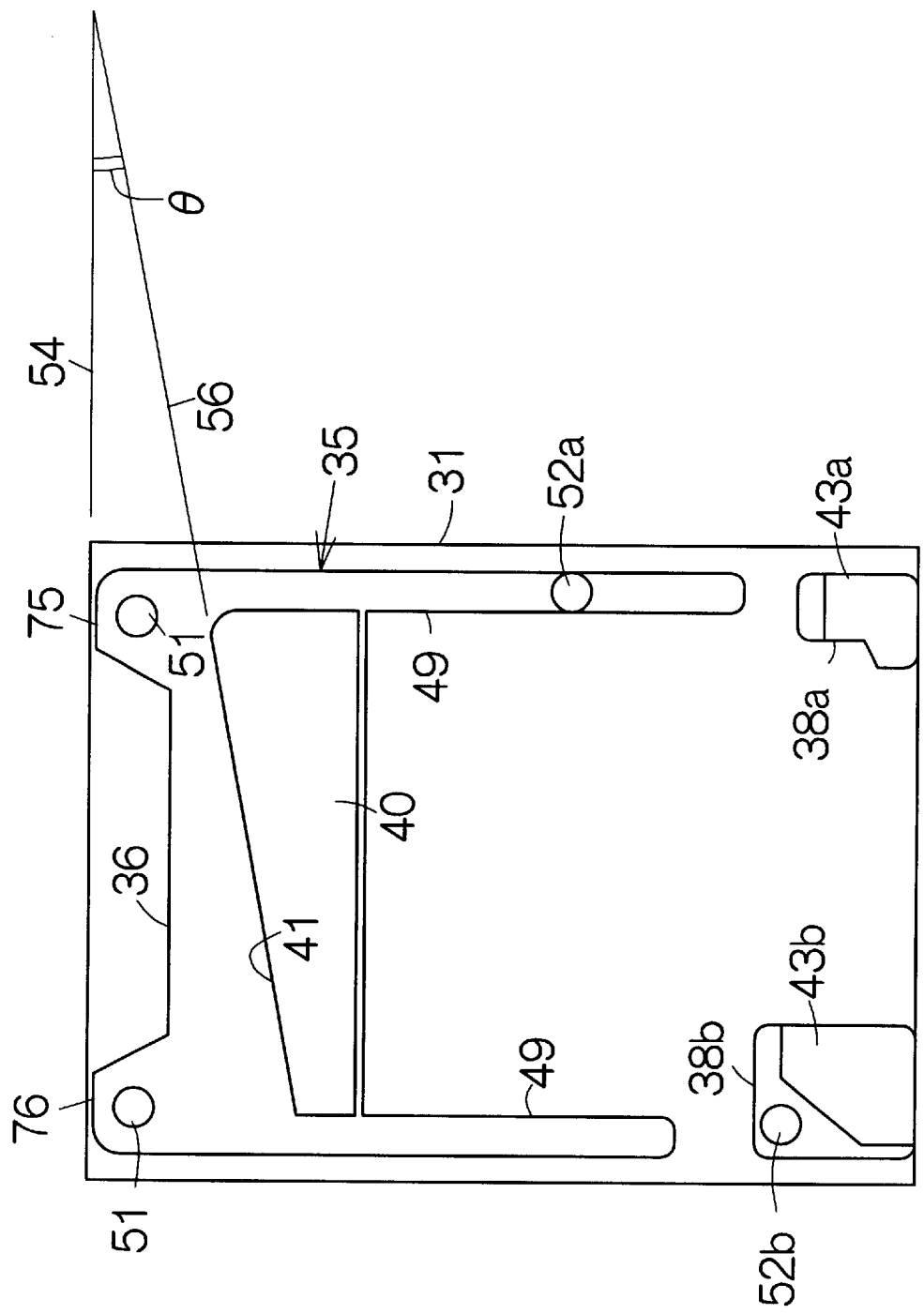
FIG. 18 is a plan view illustrating the bottom surface of a flying head slider according to a fourth modification of the second embodiment.

The formation of the first and second columnar pieces 75, 76 in the aforementioned manner may be combined with the front air bearing surface 40 of the aforementioned first embodiment in the flying head slider 18, as shown in FIG. 18, for example. Specifically, the leading end of the front air bearing surface 40 may be defined along the second datum line 56 intersecting the first datum line 54 at the predetermined angle θ.

It should be noted that any of the aforementioned flying head slider 18 may be incorporated in a magneto-optical disk drive and other types of a recording disk drive or a recording medium drive, in addition to a magnetic disk drive such as the aforementioned hard disk drive (HDD) 11, for example.

What is claimed is:

1. A flying head slider comprising:
   a slider body;
   a generally flat bottom surface defined on the slider body;
   a front rail standing on the bottom surface at an upstream position;
   a front air bearing surface defined on the front rail, which is an air bearing surface nearest to an upstream end of the slider body;
   a rear rail standing on the bottom surface at a downstream position; and
   a rear air bearing surface defined on the rear rail,
   wherein said upstream end of the bottom surface is defined along a first datum line extending in a lateral direction of the slider body, and an upstream end of the front air bearing surface is defined along a second datum line intersecting the first datum line at a predetermined inclined angle, said upstream end of the front air bearing surface being set asymmetrically relative to a longitudinal centerline of the slider body.

2. The flying head slider according to claim 1, wherein said front rail is designed to define a front surface standing on the bottom surface at a position distanced downstream from the upstream end of the bottom surface.

3. The flying head slider according to claim 2, wherein said front rail extends in the lateral direction of the slider body.

4. The flying head slider according to claim 1, wherein said second datum line is a sole straight line that intersects the first datum line for defining the upstream end of the front air bearing surface.

5. The flying head slider according to claim 4, wherein said upstream end of the front air bearing surface is configured to decrease an incidence angle of airflow as the flying head slider gets distanced from a rotation axis of a recording medium opposed to the flying header.

6. A flying head slider comprising:
   a slider body;
   a generally flat bottom surface defined on the slider body;
   a front rail standing on the bottom surface at an upstream position;
   a front air bearing surface defined on the front rail;
   a step defined on a top surface of the front rail at an upstream end of the front air bearing surface;

a rear rail standing on the bottom surface at a downstream position; and a rear air bearing surface defined on the rear rail, wherein said upstream end of the bottom surface is defined along a first datum line extending in a lateral direction of the slider body, and an upstream end of the front air bearing surface is defined along a second datum line intersecting the first datum line at a predetermined inclined angle, said upstream end of the front air bearing surface being set asymmetrically relative to a longitudinal centerline of the slider body.

7. The flying head slider according to claim 6, wherein said front rail is designed to define a front surface standing on the bottom surface at a position distanced downstream from the upstream end of the bottom surface.

8. The flying head slider according to claim 7, wherein said front rail extends in the lateral direction of the slider body.

9. The flying head slider according to claim 6, wherein said second datum line is a sole straight line that intersects the first datum line for defining the upstream end of the front air bearing surface.

10. The flying head slider according to claim 9, wherein said upstream end of the front air bearing surface is configured to decrease an incidence angle of airflow as the flying head slider gets distanced from a rotation axis of a recording medium opposed to the flying head slider.

* * * * *